United States Patent [19]
Prasad et al.

[11] Patent Number: 5,827,351
[45] Date of Patent: Oct. 27, 1998

[54] AIR SEPARATION SYSTEM AND METHOD

[75] Inventors: Ravi Prasad, East Amherst; Pauline Jane Cook, Kenmore; Christian Friedrich Gottzman, Clarence, all of N.Y.

[73] Assignee: Praxair Technology, Inc., Danbury, Conn.

[21] Appl. No.: 795,595

[22] Filed: Feb. 14, 1997

[51] Int. Cl.$^6$ .......................... B01D 53/047; B01D 53/22
[52] U.S. Cl. .................. 95/45; 95/54; 95/96; 95/130; 96/9; 96/108; 96/130
[58] Field of Search .................. 95/39, 41, 45, 95/54, 96, 130; 96/9, 108, 130, 133

[56] References Cited

U.S. PATENT DOCUMENTS

| | | | |
|---|---|---|---|
| 4,701,187 | 10/1987 | Choe et al. | 95/54 X |
| 4,765,804 | 8/1988 | Lloyd-Williams et al. | 95/54 |
| 4,783,203 | 11/1988 | Dashi | 95/54 X |
| 5,207,806 | 5/1993 | Lagree et al. | 95/54 X |
| 5,282,969 | 2/1994 | Xu | 95/45 X |
| 5,352,272 | 10/1994 | Moll et al. | 96/9 |
| 5,354,547 | 10/1994 | Rao et al. | 95/41 X |
| 5,378,263 | 1/1995 | Prasad | 95/45 X |
| 5,435,836 | 7/1995 | Anand et al. | 95/96 X |
| 5,482,539 | 1/1996 | Callahan | 95/45 X |
| 5,632,803 | 5/1997 | Stoner et al. | 95/130 X |

FOREIGN PATENT DOCUMENTS 4-090819 3/1992 Japan ......................................... 95/54

OTHER PUBLICATIONS

Bhide et al, "A new evaluation of membrane process for the oxygen–enrichment of air. Identification of optimum operating conditions and process configuration", *Journal of Membrane Science*, 62 (1991) 13–35.

Toshinori et al, "Production of High–Purity Oxygen by Continuous Membrane Column Combined with PSA Oxygen Generator", *Ind. Eng. Chem. Res.* 1994, 33, 311–316.

Mercea et al, "Oxygen separation from air combined pressure swing adsorption and continuous membrane column process", *Journal of Membrane Science* 88 (1994) 131–144.

Laguntsov et al, "The use of recycle permeator systems for gas mixture separation", *Journal of Membrane Science*, 67 (1992) 15–28.

F.P. McCandless, "A comparison of membrane cascades, some one–compressor recycle permeators, and distillation", *Journal of Membrane Science* 89 (1994) 51–72.

*Primary Examiner*—Robert Spitzer
*Attorney, Agent, or Firm*—Robert J. Follet

[57] ABSTRACT

An air separation system and method for producing a plurality of oxygen product streams at varying pressures and purities. The system combines a VPSA oxygen generator with a multi-stage cascade membrane unit to provide a high pressure, low purity product stream and a low pressure, high purity product stream.

25 Claims, 2 Drawing Sheets

AIR SEPARATION SYSTEM AND METHOD

FIELD OF THE INVENTION

This invention relates to an improved air separation system and method for economically producing oxygen at selected purities and pressures and more particularly to an air separation system and method that combines a membrane gas-permeable system having at least two stages for membrane separation with a vacuum pressure swing adsorption (VPSA) system.

BACKGROUND OF THE INVENTION

Oxygen suitable for a number of industrial and medicinal uses typically has a purity from about 97 to 99.999% and is produced at various pressures and purities. Because air typically contains nearly twenty one percent oxygen gas, its use as an economical oxygen source is highly desirable. As a result, many of the most practical and economical oxygen production plants employ air separation systems and methods.

One of the more common systems for producing oxygen in relatively large volumes incorporates cryogenic technology to liquefy and separate the desired oxygen component from the air mixture. While this design works well for mass oxygen production, the specialized cryogenic hardware and associated cost makes such a system cost-prohibitive when used for production in low to moderate volumes.

For manufacturing oxygen in moderate quantities and relatively low purities, a practical air separation system utilizes a polymer membrane having selectivity to oxygen and high permeability. Compressed air feeds the membrane that retains the nitrogen component and passes the oxygen at a relatively moderate purity. Because of the moderate selectivities inherent in conventional membranes, high purity oxygen production is usually possible only through implementation of multiple membrane stages with additional feed gas compressors. This often adds considerable cost to production, leaving substantial room for improvement in multi-staged membrane systems from a cost standpoint.

As an alternative to multi-stage membrane technology, those skilled in the art have developed an air separation system that utilizes a molecular sieve adsorbent to produce oxygen efficiently at purities ranging from approximately 88 to 95%. Used in pressure swing adsorbent (PSA) systems (and vacuum pressure swing adsorption (VPSA) systems), the adsorbent typically acts on the quadruple moment between the respective gas systems in the air to effect component separation. Unfortunately, adsorbents typically cannot separate oxygen from argon. This limitation often precludes PSA production of oxygen at higher purities approximating 98%.

One attempt to solve the problem of high purity PSA oxygen production discloses using a PSA system combined with a continuous membrane column (CMC) or a continuous membrane column and a two stage stripper (CMC-TSS) to produce oxygen at 99% purity. The product output from the PSA serves as the feed gas to the membrane system utilizing a compressor driven recycling loop and 4-port membrane modules. While beneficial for its intended purpose, this proposal requires additional compression equipment to provide the proper recycling to the CMC. Moreover, because of the specialized membrane system employed, relatively costly 4-port membrane modules generally must be used rather than the less costly 3-port designs.

Thus, although those skilled in the art have recognized the need for an air separation plant employing both permeable membrane and pressure swing adsorption technology to economically produce high purity oxygen with minimum compression hardware, up to the present invention no satisfactory system has been devised. Additionally, the need exists for an air separation system capable of producing both a main stream of high pressure, lower purity oxygen, and a side stream of low pressure, higher purity oxygen. The system and method of the present invention satisfies both these needs.

SUMMARY OF THE INVENTION

The air separation system of the present invention produces a plurality of relatively high and low pressure oxygen streams at relatively low and high purities in a cost effective manner. Cost savings are effected primarily because the present invention essentially eliminates expensive and unnecessary recycling compression equipment.

To realize the advantages identified above, a first embodiment of the air separation system of the present invention includes a PSA or VPSA oxygen generator having a compressor output connected to a feed gas manifold for collecting and directing a feed gas mixture. Downstream of the oxygen generator is a membrane cascade system including respective first and second stages operable at respective predetermined pressure ratios and within respective predetermined operating temperatures. The first stage has an inlet disposed in fluid communication with the feed gas, a retentate stream connected to a relatively high pressure and low purity product line, and a permeate product stream. The second stage includes an inlet in fluid communication with the first stage permeate product stream, a retentate stream (which can be recycled), and a second stage permeate product stream connected to a relatively low pressure, high purity product line operable at a predetermined delivery pressure and delivery purity.

A second embodiment of the air separation system of the present invention incorporates an interstage compressor and includes a PSA or VPSA oxygen generator having a compressor output connected to a feed gas manifold for collecting and directing a feed gas mixture. Downstream of the oxygen generator is a membrane cascade system including respective first and second stages. The first stage has an inlet disposed in fluid communication with the feed gas, a retentate stream connected to a relatively high pressure and moderate purity product line, and a permeate product stream fed to an interstage compressor. The second stage includes an inlet in fluid communication with the interstage compressor output, a second stage retentate stream, and a second stage permeate product stream connected to a relatively low pressure, high purity product line.

A first embodiment of the method of the present invention produces a plurality of oxygen streams at respective pressures and purities from an air separation plant. The plant comprises a PSA or VPSA oxygen generator having a compressed output and a cascade membrane unit having respective first and second stages with respective inlets. The first and second stages of the membrane unit comprising respective retentate and permeate fluid streams. The method includes the steps of feeding the PSA or VPSA output to the first stage inlet as a first feed gas; utilizing the first membrane stage retentate stream as a high pressure, low purity oxygen product stream; directing the first stage permeate to the second stage inlet as a second feed gas; and utilizing the second stage permeate stream as a high purity, low pressure oxygen product stream, while the second stage retentate can be recycled or used as a product stream of moderate purity and moderately high pressure.

A second embodiment of the method of the present invention utilizes interstage compression and produces a plurality of oxygen streams at respective pressures and purities from an air separation plant. The plant comprises a PSA or VPSA oxygen generator having a compressed output and a cascade membrane unit comprising respective first and second stages coupled by an interstage compressor. The stages each have respective inlets, with the first and second stages including respective retentate and permeate fluid streams. The method includes the steps of feeding the PSA or VPSA output to the first stage inlet as a first feed gas; utilizing the first stage retentate stream as a high pressure, low purity oxygen product stream; directing the first stage permeate to the interstage compressor; pressurizing the first stage permeate stream with the compressor for distribution to the second stage inlet as a second feed gas; and utilizing the second stage permeate stream as a high purity, low pressure oxygen product stream, while the second stage retentate stream can be recycled or used as a moderate-purity product at a low to moderately high pressure.

Inclusion of additional membrane stages is possible.

BRIEF DESCRIPTION OF THE DRAWINGS

The above and other features of the present invention may be more fully understood from the following detailed description, taken together with the accompanying drawings, wherein similar reference characters refer to similar elements throughout.

DETAILED DESCRIPTION OF THE INVENTION

The air separation system of the present invention produces a plurality of oxygen streams at different pressures and purity levels. By incorporating a straightforward design (including a reduced number of gas compressors), and utilizing a combination of air separation technologies, the system of the present invention realizes substantial cost savings.

Figure 1:
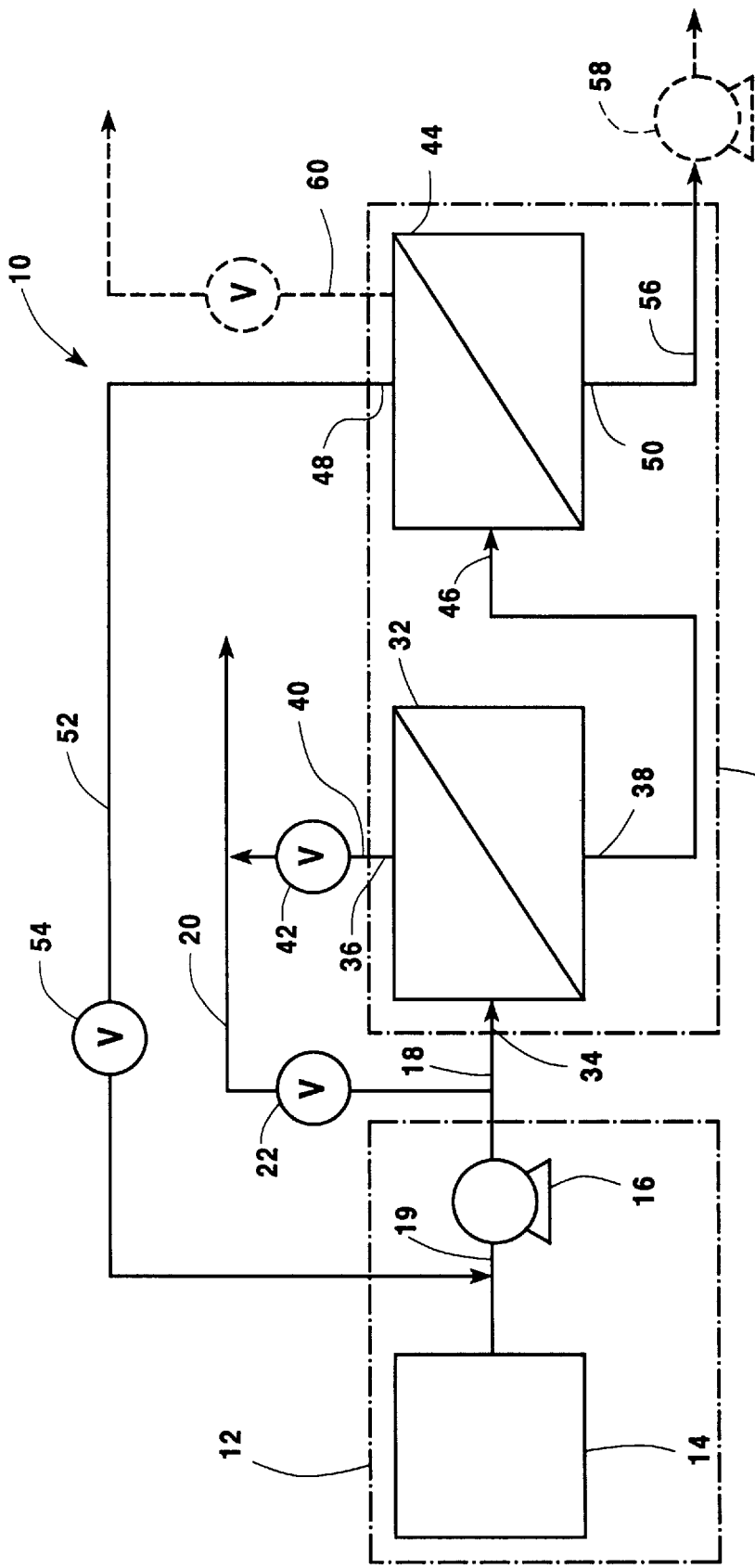
FIG. 1 is a schematic flow diagram of a first embodiment of the air separation system and illustrates a first embodiment of the method of the present invention.

Referring now to FIG. 1, a first embodiment of the air separation system of the present invention, generally designated 10 includes an oxygen generator 12 of the type incorporating an adsorbent (PSA or VPSA), and a staged membrane sub-system 30. Because conventional PSA and VPSA plants and membrane systems alone typically cannot economically produce oxygen at purities greater than 95%, the present invention uses all of or a portion of the oxygen generator product output as feed gas to the membrane sub-system which further separates the gas into a plurality of oxygen streams at varying pressures and purities.

The oxygen generator 12 typically comprises a vacuum pressure swing adsorption plant 14 capable of producing approximately 100,000 ncfh product containing approximately 92% oxygen, 5% argon, and 3% nitrogen. VPSA typically utilizes a molecular sieve adsorbent, such as molecular sieve 5A (MS-5A), to efficiently produce the desired oxygen purity. For pressurizing the oxygen product output, a compressor 16 is connected downstream of the VPSA unit to produce feed gas pressures typically approximating 100–200 PSIA through a feed gas discharge manifold line 18. A convenient stream of high pressure, low purity oxygen (i.e. at the purity discharged from the VPSA system) is available through a product manifold line 20 connected to the discharge manifold line 18 and controlled by a low-purity product control valve 22.

Most or all of the product directed through the discharge manifold feeds the staged membrane sub-system 30. Preferably, and to minimize hardware and operating costs, the membrane sub-system comprises a two stage cascade configuration, although additional stages (not shown) may be utilized to further increase the product purity if desired.

Further referring to FIG. 1, the membrane cascade sub-system 30 includes a first stage 32 having an inlet 34 connected to the feed gas discharge manifold 18. The stage produces oxygen-enriched permeate and oxygen-depleted retentate. The stage includes first and second outlets 38 and 36, that discharge the oxygen-enriched and oxygen-depleted products from the membrane stage. Connected to the low purity retentate product outlet 36 is a high pressure line 40 controlled by a flow control valve 42 to regulate flow into the high pressure low-purity product manifold line 20. The second-permeate outlet 38 is connected to and feeds an inlet 46 to a second stage 44.

The second stage 44 of the membrane cascade sub-system 30 receives the permeate product from the first stage and includes a recycle (retentate) output 48 and a high purity product (permeate) outlet 50. A recycle line 52 controlled by a recycle control valve 54 connects the recycle output with the inlet 19 to the VPSA compressor 16. The high purity product outlet 50 is connected via a high purity and low pressure delivery line 56 to the customer, typically to a customer compressor 58 to deliver low pressure oxygen at purity levels near or above 98%.

Alternatively, the second stage recycle stream 48 may be connected to a moderate pressure and moderate purity product line 60 rather than recycle back to the VPSA. Those skilled in the art will recognize that such a configuration reduces the overall power consumed, since there is no cost associated with the raw material (air) except for compression.

Tables I and II reproduced below, illustrate the operating conditions employed, and the respective results achieved, from a specific example of the aforedescribed embodiment.

For all examples below, the membranes utilized comprised relatively inexpensive 3-port designs having the following properties at 70° F.: oxygen permeability/thickness $(P/tO_2)=1.5$ ncfh/ft$^2$-psi-day, selectivity $(O_2/N_2)=5.27$, and selectivity $(O_2/Ar)=2.55$. Moreover, the feed/permeate pressure ratio in each stage was 2.66.

EXAMPLE 1

A VPSA plant producing 100,000 ncfh containing 92% $O_2$, 5% Ar and 3% $N_2$ at 175 psia. A portion of this stream is used as the feed to a membrane cascade system (2 stages) to produce 5,000 ncfh product containing 98% $O_2$ and delivered at 24.7 psia. The membrane area employed was approximately 5773 ft$^2$.

TABLE I

| Location | Flow (ncfh) | Pressure (psia) | Purity (% $O_2$) |
|---|---|---|---|
| VPSA compressor outlet | 115,291 | 175 | 92 |
| Stage 1 inlet | 98,331 | 175 | 92 |

TABLE I-continued

| Location | Flow (ncfh) | Pressure (psia | Purity (% $O_2$) |
|---|---|---|---|
| Stage 1 permeate | 20,291 | 65.7 | 95.4 |
| Recycle | 15,291 | 65.7 | 95.4 |
| Low purity product* | 95,000 | 175 | 91.7 |
| Stage 2 permeate product | 5,000 | 24.7 | 98 |

*Stage 1 Retentate plus post-VPSA compressor output

While the data tabulated above neglects the effect of the recycle stream on the purity of the feed to the membrane cascade sub-system 30, those skilled in the art will recognize that such an effect would cause a small increase in the feed purity and thus a slight decrease in the membrane area and flowrate requirement.

The inventors have found it possible, and desirable, to optimize the pressure ratio in each stage while utilizing the same overall pressure ratio. Doing this can favorably affect the membrane area and recycle flowrate. Additionally, the operating temperature and stage cut (i.e. ratio of membrane retentate flow to membrane feed flow for the same stage) of operation may be optimized to suit ambient conditions. Finally, membranes with different properties may be used for each stage. In certain instances (e.g. when the high-purity product of stage 2 needs to be delivered at a higher pressure) it will be advantageous to use an interstage compressor to decrease the membrane area requirement and compression power needed for the system. This is accomplished at the expense of using a larger compressor than would otherwise be required for the product compressor. Nevertheless, the interstage compressor can offer an overall cost advantage.

Figure 2:
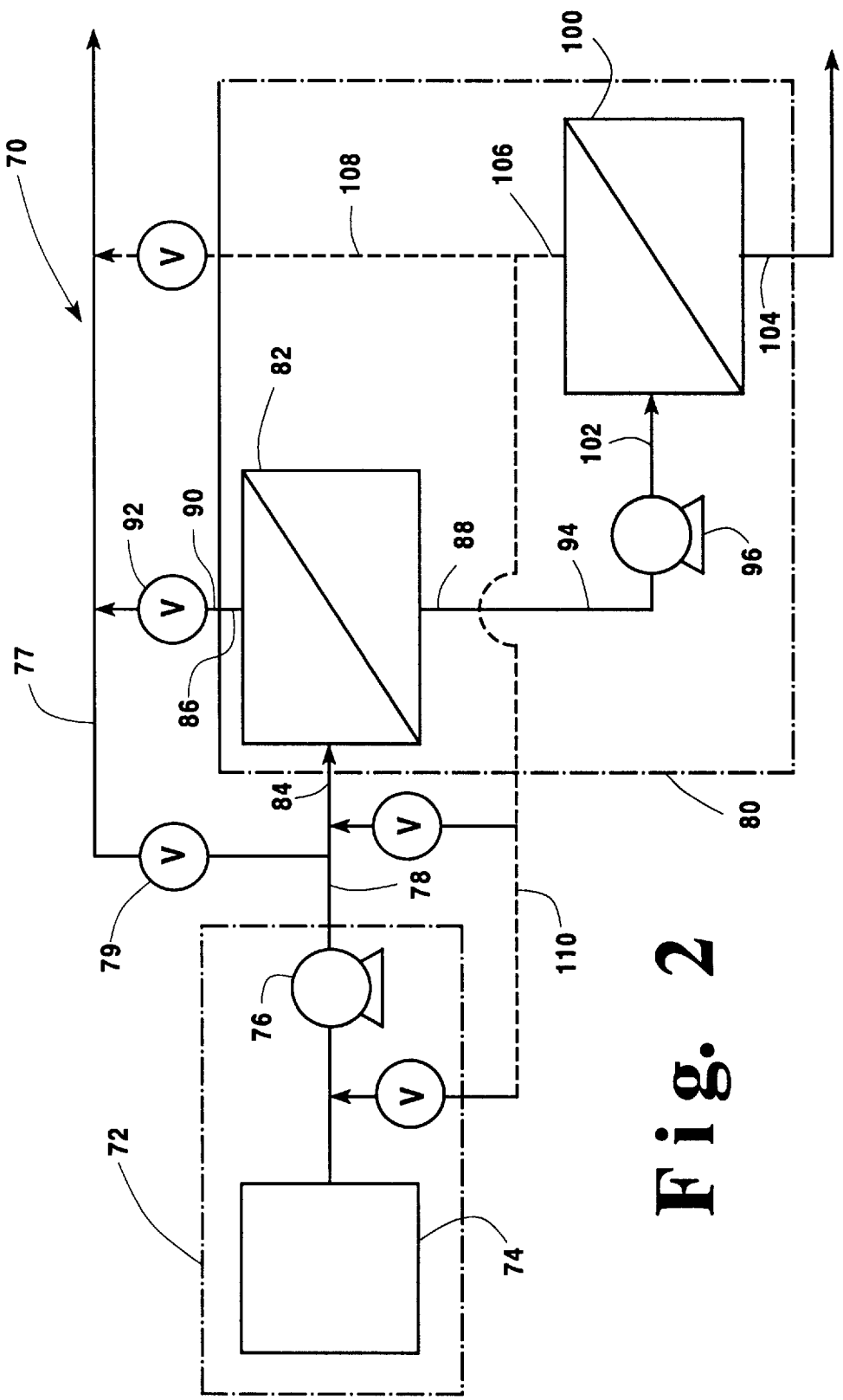
FIG. 2 is a schematic flow diagram of a second embodiment of the air separation system and illustrates a second embodiment of the method of the present invention.

Referring now to FIG. 2, a second embodiment of the air separation system of the present invention, generally designated 70, incorporates a membrane cascade sub-system 80 utilizing interstage compression to allow production of the high purity product stream at a substantially higher pressure.

The air separation system 70 preferably includes a PSA or VPSA oxygen generator 72 substantially similar to that disclosed in the first embodiment and including a PSA or VPSA unit 74, conduit 75 and VPSA product gas compressor 76. A discharge manifold 78 directs the feed gas VPSA output to the inlet of the membrane cascade sub-system 80. Like the first embodiment, the PSA/VPSA product output stream may be tapped through connection of a high pressure, low purity product line 77 controlled by a product valve 79.

With continued reference to FIG. 2, the membrane sub-system 80 preferably includes two membrane stages 82 and 100 joined by an interstage compressor 96. The first stage 82 includes an inlet 84 for receiving the VPSA output feed gas, and respective permeate and retentate outlets 88 and 86 for directing the separated fluid components. The first stage retentate outlet 86 is connected to the high pressure, low purity product manifold 77 through a discharge line 90 controlled by a flow control valve 92. The first stage permeate outlet 88 is fed to an inlet 94 of the interstage compressor 96 for subsequent pressurized supply to the second stage 100.

The second stage 100 includes an inlet 102 for receiving the pressurized first stage permeate stream and includes a high purity and moderately pressurized second stage permeate product stream outlet 104 and a lower purity second stage retentate stream supply port 106.

The inventor has discovered that the second stage retentate stream supply port 106 may be conveniently connected in one of three configurations to maximize flexibility of the air separation system 70. FIG. 2 illustrates the possible configurations for the second stage retentate stream including a direct connection through a product supply line 108 to the high pressure and low purity product manifold 77; a connection via a recycle line 110 back to the inlet 79 of VPSA product compressor 76, when the second stage pressure is lower than the first stage feed pressure; or a fluid attachment via the recycle line 110 to the first stage inlet 84. The latter is possible when the second stage retentate pressure is greater than or equal to the first stage feed pressure.

This embodiment is illustrated in Example 2 below which includes a comparison between a system without interstage compression and a system with interstage compression. Interstage compression is used where the feed pressure to the second stage is determined by the desired product pressure and purity. Interstage compression serves to decrease the membrane area and compressor power.

EXAMPLE 2

Table II shows the result for a 2-stage system without interstage compression. The input to the two stage membrane unit is a VPSA plant product delivered at 100,000 ncfh containing 92% $O_2$, 5% Ar and 3% $N_2$ at 150 psia. The desired purity for the high-purity $O_2$ product is 98% $O_2$ at 114.7 psia and a flow rate of 5,000 ncfh. The same type of membranes are used as in Example 1. It is clear that without product compression the operation reflected in Table II will not produce product at the desired pressure. Moreover, the membrane requirement without interstage compression is 5609 ft$^2$, compared to 2345 ft$^2$ with interstage compression.

TABLE II

| Location | Flow (ncfh) | Pressure (psia | Purity (% $O_2$) |
|---|---|---|---|
| VPSA compressor outlet | 111,051 | 150 | 92 |
| Stage 1 inlet | 79,269 | 150 | 92 |
| Stage 1 permeate | 16,051 | 60 | 95.94 |
| Recycle | 11,051 | 60 | 95 |
| Low purity product | 95,000 | 150 | 91.7 |
| Stage 2 permeate | 5,000 | 15 | 98.02 |
| Stage 2 permeate product | 5,000 | 114.7 | 98.02 |

Table III reproduced below illustrates the operating parameters and results achieved in a specific example of the second embodiment of the present invention using interstage compression.

TABLE III

| Location | Flow (ncfh) | Pressure (psia | Purity (% $O_2$) |
|---|---|---|---|
| VPSA compressor outlet | 100,000 | 150 | 92 |
| Stage 1 inlet | 43,300 | 150 | 92 |
| Stage 1 permeate | 10,753 | 15 | 96.54 |
| Stage 2 feed | 10,753 | 229.4 | 96.54 |
| Stage 2 retentate | 5,753 | 229.4 | 95.25 |
| Low purity product* | 95,000 | 150 | 91.7 |
| Stage 2 permeate product | 5,000 | 114.7 | 98.02 |

*Stage 2 Retentate plus VPSA compressor output

Utilizing interstage compression, and dictating the feed pressure to the second stage as a function of the desired product pressure and purity, decreases the membrane area and compression power needed by the system overall. Illustrative of this trade-off is the fact that the second embodiment, as operated under the parameters shown in Table III, utilized only 2345 square feet of membrane area. This should be compared to the 5609 square feet of area required for the embodiment operating under the conditions of Table II. However, the trade-off involves the expense of using a larger compressor 96 as an interstage compressor, rather than operating a product compressor 58 utilized in the first embodiment.

It will usually be more advantageous to combine the membrane sub-system with the VPSA generator in cases where no additional product compression equipment is required. However, in those cases demanding such equipment, by utilizing it between stages, similar to a recycle cascade system, substantial economic benefits may be realized.

Those skilled in the art will appreciate the many advantages offered by the air separation system of the present invention. First and foremost, the straightforward system design incorporates relatively few inexpensive membrane modules and eliminates unnecessary recycle line compressors. By eliminating unnecessary hardware, both equipment costs and operating expenses are substantially reduced. In the case of interstage compression, substantial capital savings are realized in membrane area.

Furthermore, the invention provides a plurality of product streams at varying pressures to satisfy the needs of product applications that do not necessarily require ultra-high purity oxygen at specific pressures. Because more product may be used from a given source of supply, overall efficiency of the plant increases with corresponding drops in production and operation costs.

It should be appreciated that the terms "high-purity and "low-purity" applied to oxygen (more accurately, to gas of high oxygen content) are relative terms implying a comparison of the purity of a particular oxygen stream with that typically emerging from the PSA/VPSA portion of the process. Thus, "high-purity" means higher than 95%, preferably 97% or higher, and "low-purity" means the same as or lower than the purity achieved by PSA/VPSA. In all cases, however, a gas of high to very high oxygen content is contemplated.

While the preferred embodiments have been described and illustrated, various substitutions and modifications may be made thereto without departing from the spirit and scope of the invention. Accordingly, it is to be understood that the present invention has been described by way of illustration and not limitation.

We claim:

1. A method of producing a plurality of oxygen streams at respective pressures and purities from an air separation plant comprising a PSA or VPSA oxygen generator having a compressed output and a cascade membrane unit having respective first and second stages with respective inlets, each of said first and second stages including respective retentate and permeate fluid streams, said method including the steps of:

feeding said VPSA output to said first stage inlet as a first feed gas;

utilizing said first stage retentate stream as a high pressure, low purity oxygen product stream in an industrial or medicinal product application;

directing said first stage permeate to said second stage inlet as a second feed gas; and utilizing said second stage permeate stream as a high purity, low pressure oxygen product stream.

2. A method according to claim 1 and further including the step of:

pressurizing said high purity, low pressure oxygen product stream with a product compressor.

3. A method according to claim 1 and further including the step of:

recycling said second stage retentate stream back to said VPSA compressor inlet.

4. A method according to claim 1 and further including the step of:

utilizing said second stage retentate stream as a moderate pressure, moderate purity oxygen product stream.

5. A method according to claim 1 and further including the step of:

utilizing a portion of said first feed gas as a high pressure, low purity oxygen product stream.

6. A method of producing a plurality of oxygen streams at respective pressures and purities from an air separation plant comprising a PSA or VPSA oxygen generator having a compressed output and a cascade membrane unit having respective first and second stages coupled by an interstage compressor and having respective inlets, each of said first and second stages including respective retentate and permeate fluid streams, said method including the steps of:

feeding said VPSA output to said first stage inlet as a first feed gas;

utilizing said first stage retentate stream as a high pressure, low purity oxygen product stream;

directing said first stage permeate to said interstage compressor;

pressurizing said first stage permeate stream with said compressor for distribution to said second stage inlet as a second feed gas; and utilizing said second stage permeate stream as a high purity, low pressure oxygen product stream.

7. A method according to claim 6 and further including the step of:

utilizing said second stage retentate stream as a moderate pressure, moderate purity oxygen product stream.

8. A method according to claim 6 and further including the step of:

recycling said second stage retentate stream back to said VPSA compressor inlet.

9. A method according to claim 6 and further including the step of:

recycling said second stage retentate stream back to said first stage inlet.

10. A method according to claim 6 and further including the step of utilizing a portion of said first feed gas as a high pressure, low purity oxygen product stream.

11. An air separation system for producing a plurality of oxygen streams at respective predetermined pressures and purities, said system including:

an oxygen generator including an adsorbent and having a compressor output connected to a feed gas manifold for collecting and directing a feed gas mixture within a feed purity range and a feed pressure range; and a membrane cascade system including respective first and second stages operable at respective predetermined pressure ratios and within respective predetermined operating temperatures, said first stage having an inlet disposed in fluid communication with said feed gas, a first stage retentate stream connected to a relatively high pressure and low purity product line which is connected to an industrial or medicinal product application, and a first stage permeate stream, said second stage including an inlet joined in fluid communication with said first stage permeate stream, a second stage retentate stream, and a product stream connected to a relatively low pressure, high purity product line operable at a predetermined delivery pressure and delivery purity.

12. An air separation system according to claim 11 wherein:

said oxygen generator is a vacuum pressure swing adsorption plant.

13. An air separation system according to claim 11 wherein:

said second stage retentate stream is connected to a vacuum pressure swing adsorption compressor to form a recycle loop.

14. An air separation system according to claim 11 wherein:

said second stage retentate stream is connected to a relatively moderate pressure and purity product line.

15. An air separation system according to claim 11 and further including a compressor having an inlet disposed in fluid communication with said second stage low pressure, high purity product line.

16. An air separation system according to claim 11 and further including:

a relatively high pressure and low purity product line disposed in fluid communication with said feed gas manifold.

17. An air separation system according to claim 16 and further including one or more subsequent stages having respective product streams and respective inlets connected to the respective previous stage permeate product streams and including respective retentate streams recycled back to said feed gas manifold or to said relatively high pressure and low purity product line.

18. An air separation system according to claim 11 wherein:

said feed purity range is approximately 88%–95%;

said feed pressure range is approximately 100–500 PSIG;

said respective predetermined pressure ratios exceed 1.5;

said respective operating temperatures are within the range of 30–150 degrees F.;

said product delivery pressure is within the range 1–300 PSIG; and said product delivery purity is within the range 97%–99.5% oxygen.

19. An air separation system for producing a plurality of oxygen streams at respective predetermined pressures and purities, said system including:

an oxygen generator of the type including an adsorbent and having a compressor output connected to a feed gas manifold for collecting and directing a feed gas mixture within a feed purity range and a feed pressure range; and a membrane cascade system including respective first and second stages operable at respective predetermined pressure ratios and within respective predetermined operating temperatures, said first stage having an inlet disposed in fluid communication with said feed gas, a first stage retentate system connected to a relatively high pressure and moderate purity product line, and a first stage permeate stream fed to an interstage compressor, said second stage including an inlet joined in fluid communication with said interstage compressor output, a second stage retentate stream, and a second stage product stream connected to a relatively low pressure, high purity product line.

20. An air separation system according to claim 19 wherein:

said oxygen generator is a VPSA plant.

21. An air separation system according to claim 19 and further including:

a relatively high pressure and moderate purity product line disposed in fluid communication with said feed gas manifold.

22. An air separation system according to claim 21 wherein:

said second stage retentate stream is fed to said relatively high pressure and low purity product line.

23. An air separation system according to claim 19 wherein:

said second stage retentate stream is recycled back to said oxygen generator.

24. An air separation system according to claim 19 wherein:

said second stage retentate stream is recycled back to said feed gas manifold.

25. An air separation system according to claim 19 wherein:

said feed purity range is approximately 88%–93%;

said feed pressure range is approximately 100–500 PSIG;

said respective predetermined pressure ratios exceed 1.5;

said respective operating temperatures are within the range of 30–150 degrees F.;

said product delivery pressure is within the range 1–300 PSIG; and said product delivery purity is within the range 97%–99.5% oxygen.

* * * * *